United States Patent
Cocchi et al.

(10) Patent No.: US 9,642,379 B2
(45) Date of Patent: May 9, 2017

(54) MACHINE AND METHOD FOR MAKING AND DISPENSING ICE CREAMS

(71) Applicant: ALI S.p.a.—CARPIGIANI GROUP, Milan (IT)

(72) Inventors: Andrea Cocchi, Calderara di Reno (IT); Roberto Lazzarini, Reggio Emilia (IT)

(73) Assignee: ALI S.P.A.-CARPIGIANI GROUP, Milan (IT)

( * ) Notice: Subject to any disclaimer, the term of this patent is extended or adjusted under 35 U.S.C. 154(b) by 135 days.

(21) Appl. No.: 14/596,321

(22) Filed: Jan. 14, 2015

(65) Prior Publication Data
US 2015/0201645 A1    Jul. 23, 2015

(30) Foreign Application Priority Data
Jan. 17, 2014    (IT) .............................. BO2014A0018

(51) Int. Cl.
| A23G 9/04 | (2006.01) |
| A23G 9/22 | (2006.01) |
| A23G 9/12 | (2006.01) |
| A23G 9/30 | (2006.01) |
| A23G 9/08 | (2006.01) |
| A23G 9/28 | (2006.01) |

(52) U.S. Cl.
CPC .............. *A23G 9/228* (2013.01); *A23G 9/08* (2013.01); *A23G 9/12* (2013.01); *A23G 9/22* (2013.01); *A23G 9/227* (2013.01); *A23G 9/287* (2013.01); *A23G 9/30* (2013.01)

(58) Field of Classification Search
CPC . A23G 9/04; A23G 9/08; A23G 9/227; A23G 9/30; F25C 5/187; F25C 2700/02
USPC .................................................... 62/135, 137
See application file for complete search history.

(56) References Cited

U.S. PATENT DOCUMENTS

| 4,703,628 A | 11/1987 | Togashi et al. |
| 5,463,878 A * | 11/1995 | Parekh ..................... A23G 9/28 222/146.6 |
| 6,553,779 B1 | 4/2003 | Boyer et al. |

(Continued)

OTHER PUBLICATIONS

Italian Search Report dated Sep. 15, 2014 from counterpart App No. BO20140018.

*Primary Examiner* — Marc Norman
(74) *Attorney, Agent, or Firm* — Shuttleworth & Ingersoll, PLC; Timothy J. Klima

(57) ABSTRACT

A machine for making and dispensing ice creams, comprises in combination: a container designed to contain a basic mixture for converting it into ice cream; a mixer and a refrigeration system, operatively associated with said container respectively for mixing said basic mixture and for cooling said basic mixture in such a way as to convert it, in the container, into ice cream; a control and operating unit, operatively associated with said refrigeration system for controlling activation and deactivation of said refrigeration system and for regulating its cooling thermal power at least between a first, production thermal power and a second, preservation thermal power which is lower than said first, production thermal power, said control and operating unit being designed to allow said refrigeration system to be activated at the second, preservation power when said container is substantially empty.

18 Claims, 3 Drawing Sheets

(56) References Cited

U.S. PATENT DOCUMENTS

2007/0102448 A1* 5/2007 Harra .................... A23G 9/20
  222/146.6
2013/0269381 A1 10/2013 Cocchi et al.
2015/0306640 A1* 10/2015 Lazzarini ................ B08B 9/08
  134/18

* cited by examiner

MACHINE AND METHOD FOR MAKING AND DISPENSING ICE CREAMS

This application claims priority to Italian Patent Application No. BO2014A000018filed Jan. 17, 2014, which application is incorporated by reference herein.

BACKGROUND OF THE INVENTION

This invention relates to a machine and a method for making and dispensing ice cream.

This type of machine is known to experts in the trade by the term mixing and freezing machine.

The machine comprises a mixing and freezing cylinder designed to receive the basic product and to convert the basic product into ice cream—by a combination of mixing and cooling.

Functionally associated with the cooling cylinder there is a refrigeration system which cools the product inside the mixing and freezing cylinder.

The refrigeration system is active during product processing. When product is not being processed, the refrigeration system is inactive so as not to consume electrical power.

Under certain conditions (for example, high outside temperature), prior art ice cream machines suffer from problems of food safety.

In effect, after processing a batch of ice cream, residues of the processed product may remain in the mixing and freezing cylinder or in other parts of the machine. These residues may harbor bacteria and, if left at unsuitable temperatures, will allow the bacteria to proliferate and to contaminate the machine.

The presence of bacteria inside the machine leads to serious risks to the food safety of the batches of product subsequently processed.

Thus, a need which is felt particularly strongly by operators in the trade is that of having a machine for making and dispensing ice creams which is particularly safe during normal use, even if outside temperatures are high.

SUMMARY OF THE INVENTION

This invention therefore has for an aim to overcome the above described drawbacks and to meet the above mentioned need.

More specifically, the aim of this invention is to provide a machine and a method for making and dispensing ice creams.

A further aim of the invention is to provide a machine and a method for making and dispensing ice creams which allows making ice creams which are particularly safe in terms of hygiene for end consumers.

According to the invention, this aim is achieved by a machine and a method for making and dispensing ice creams, forming the object of the invention and comprising the technical features described in one or more of the appended claims.

BRIEF DESCRIPTION OF THE DRAWINGS

The technical features of the invention, with reference to the above aims, are clearly described in the claims below and its advantages are apparent from the detailed description which follows, with reference to the accompanying drawings which illustrate a non-limiting example embodiment of the invention and in which:

DESCRIPTION OF THE PREFERRED EMBODIMENTS

Figure 1:
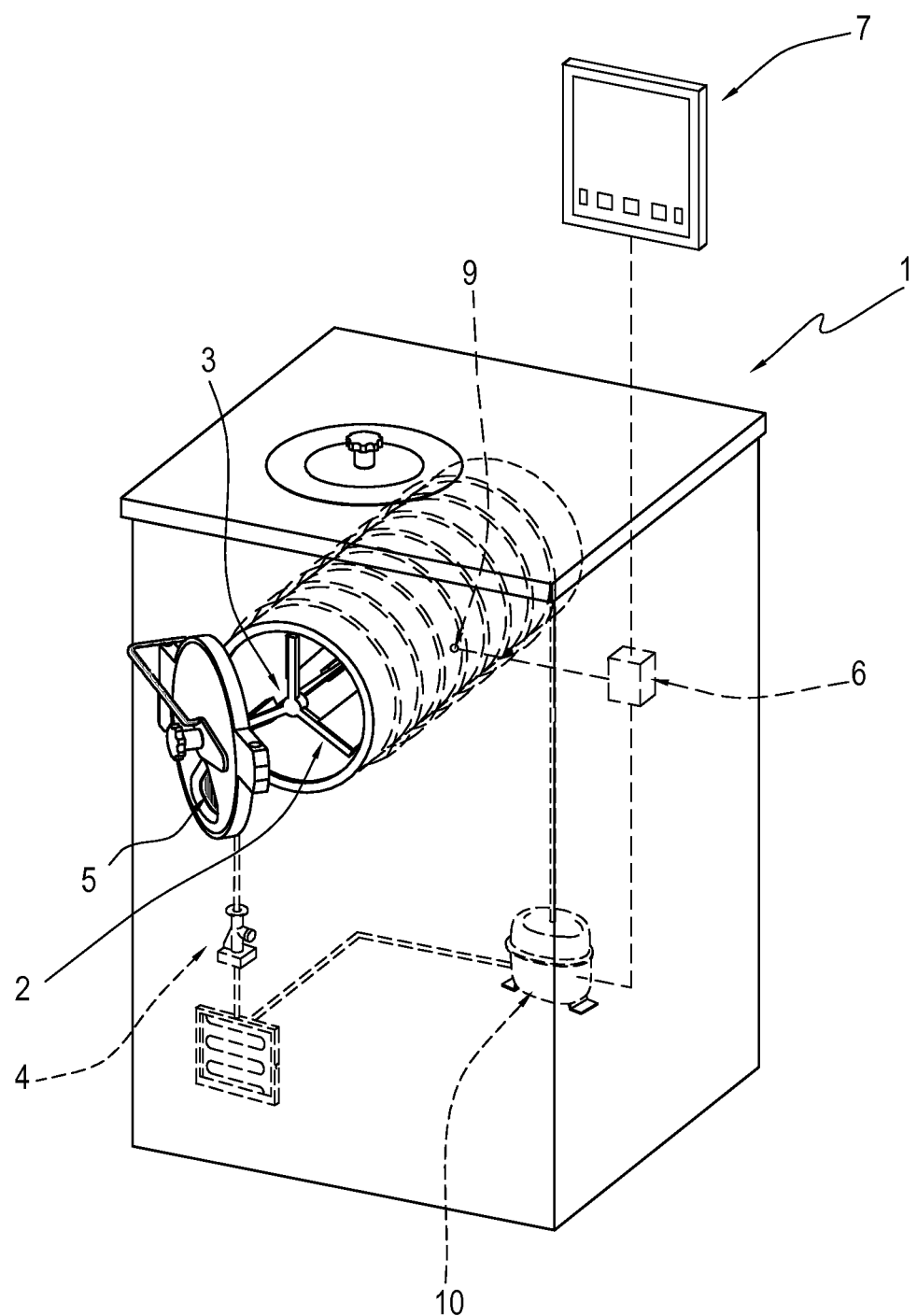
FIG. 1 is a schematic view of a first embodiment of a machine for making and dispensing ice creams forming the object of the invention.

With reference to the accompanying drawings, the numeral 1 denotes a machine for making and dispensing liquid or semi-liquid food products according to this invention.

Preferably, the machine 1 is a machine for making and dispensing ice creams (that is, a mixing and freezing machine).

The machine 1 for making and dispensing ice creams, comprises in combination: a container 2 designed to contain a basic mixture for converting it into ice cream; a mixer 3 and a refrigeration system 4, operatively associated with the container 2 respectively for mixing the basic mixture and for cooling the basic mixture in such a way as to convert it, inside the container 2, into ice cream; a device 5 for dispensing the ice cream, operatively connected to the container 2 for allowing the ice cream to be extracted from the container 2; a control and operating unit 6, operatively associated with the refrigeration system 4 for controlling activation and deactivation of the refrigeration system 4 and for regulating its cooling thermal power at least between a first, production thermal power and a second, preservation thermal power.

The second, preservation thermal power is lower than the first, production thermal power.

The term "thermal power" is used to mean the thermal power exchanged at the exchanger (evaporator) associated with the container 2.

The control and operating unit 6 is configured to allow the refrigeration system 4 to be activated (automatically or following a user action) at the second, preservation power when the container 2 is substantially empty (that is, when there is a condition of no basic mixture or ice cream inside the container 2).

Preferably, the machine comprises a user interface (not illustrated) provided with controls to command the control unit 6 to activate the refrigeration system 4 at the second, preservation power.

Preferably, the user interface comprises a control panel equipped with the above mentioned controls.

Preferably, the controls are pushbuttons or selector switches of any kind.

That way, advantageously, the user can decide when to activate the refrigeration system at the second thermal power.

Figure 2:
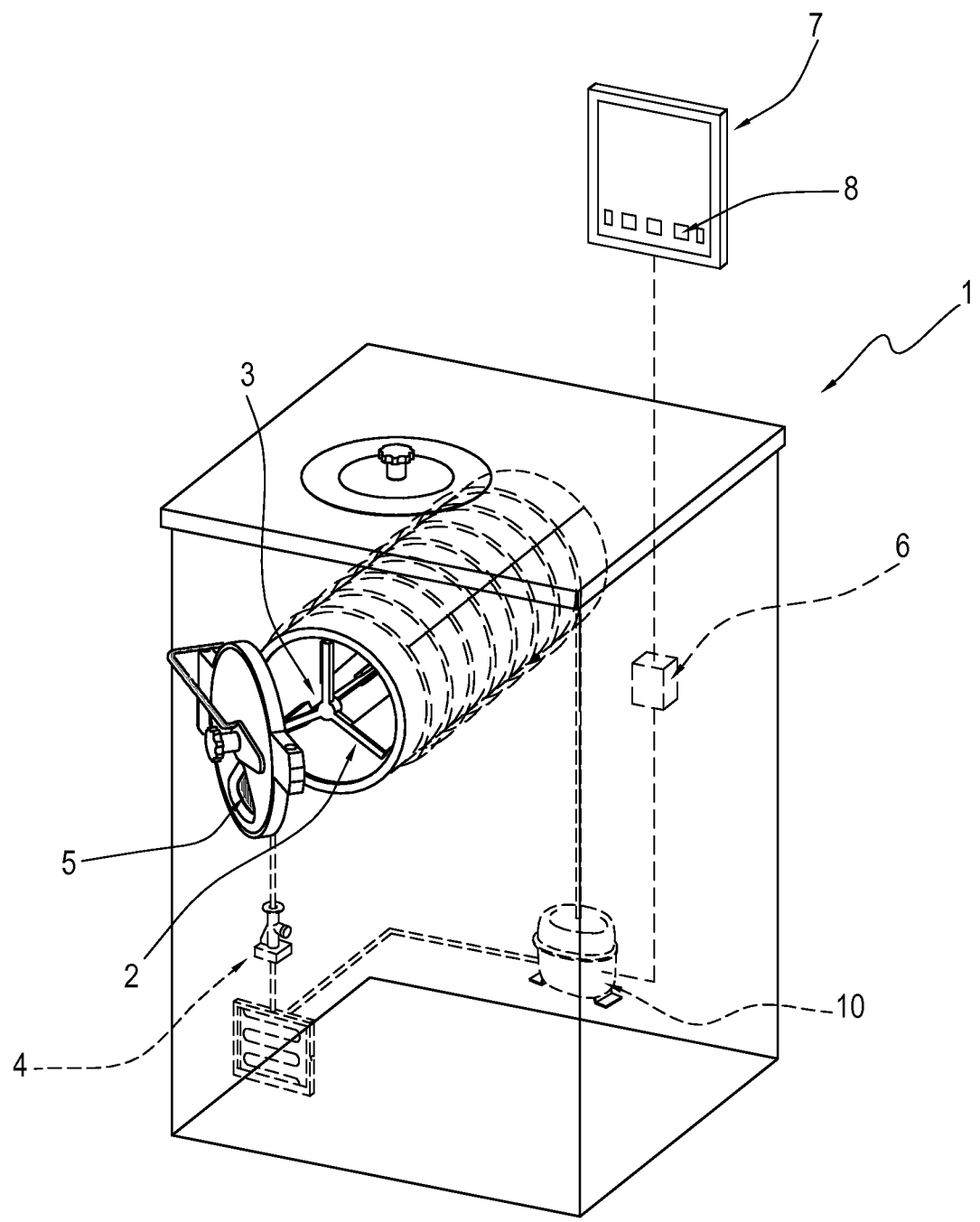
FIG. 2 is a schematic view of a second embodiment of a machine for making and dispensing ice creams forming the object of the invention.

With regard to the container 2 and the embodiments illustrated in FIGS. 1 and 2, it should be noted that the container 2 is preferably a mixing and freezing cylinder with a front cover and an ice cream dispensing tap 5.

It should also be noted that—preferably but not necessarily—the mixing and freezing cylinder 2 is mounted horizontally.

With specific reference to the refrigeration circuit, it should be noted that the refrigeration circuit preferably comprises a first exchanger for giving off heat and a second exchanger for absorbing heat, a compressor, and a throttle valve.

The second exchanger is operatively associated with the container 2 in order to cool the product (ice cream or basic mixture) contained therein.

With reference to the mixer 3, on the other hand, it should be noted that the mixer 3 is equipped with one or more blades configured to scrape the inside surface of the container 2.

Figure 3:
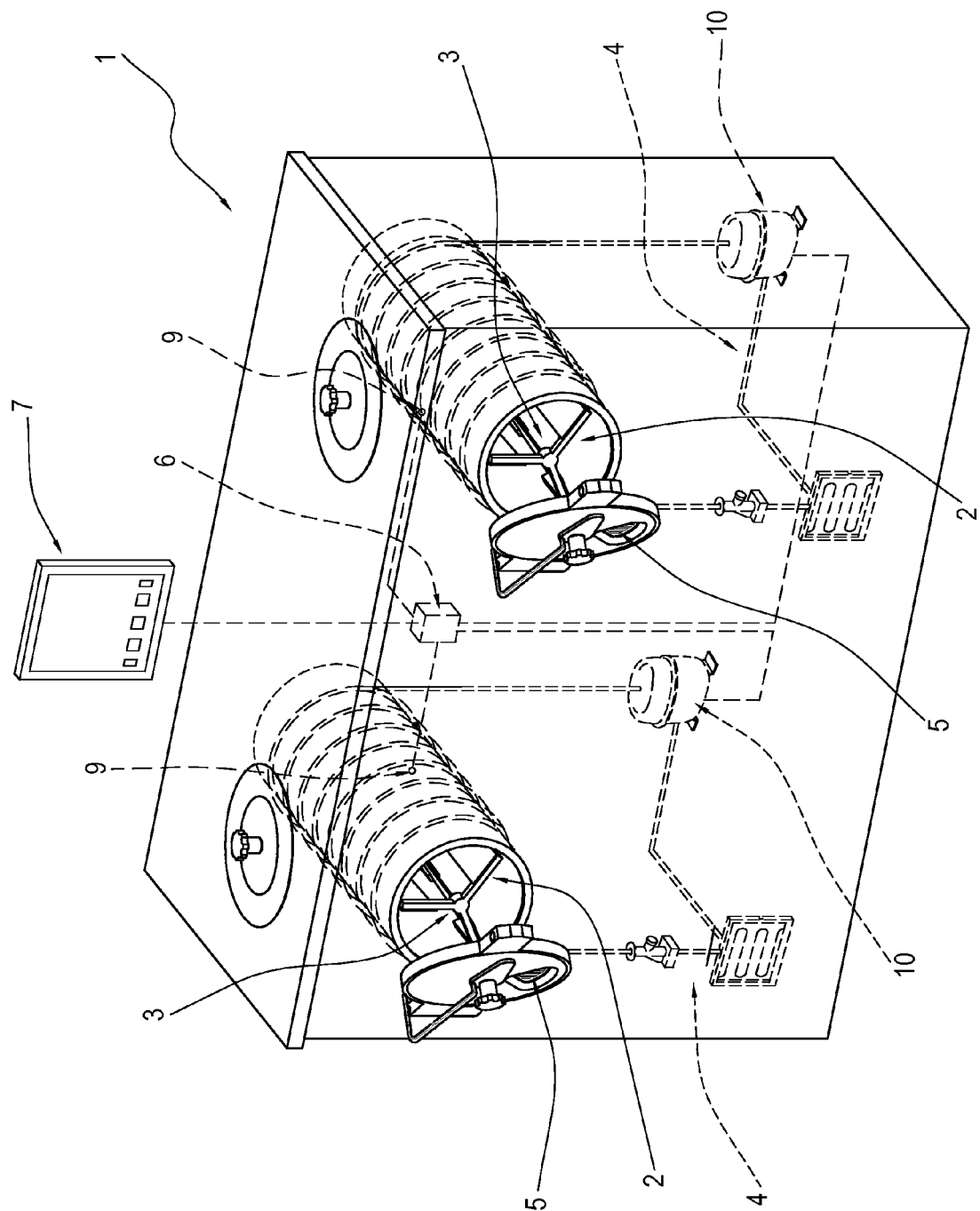
FIG. 3 is a front view of a second embodiment of a machine for making and dispensing ice creams forming the object of the invention.

FIGS. 1 and 2 show a machine 1 with a single container 2. FIG. 3, on the other hand, shows a machine 1 with two independent containers 2.

In the embodiment shown in FIG. 3, the machine 1 preferably comprises a refrigeration system 4 for each of the two containers 2 so that the containers can be used independently of one another.

Preferably, the control and operating unit 6 comprises an operator interface 7.

In the embodiment shown in FIG. 2, the operator interface 7 is provided with at least one control element 8 which can be operated by a user to activate the refrigeration system 4 at the second, preservation power.

In practice, the control element 8 is preferably a pushbutton (physical or touch screen) or a switch (physical or touch screen) which can be operated by the operator to activate the refrigeration system 4 at the second, preservation power.

In the embodiment shown in FIG. 1, the machine 1 comprises at least one sensor 9 associated with the container 2 and configured to detect the presence of basic mixture or ice cream in the container 2 and connected to the control and operating unit 6 to generate a signal indicating the presence (or absence) of the basic mixture or ice cream in the container 2.

According to this aspect, the control and operating unit 6 is configured to activate the refrigeration system 4 at the second, preservation power when the signal indicates the absence of the basic mixture or ice cream inside the container 2.

Alternatively, the machine 1 comprises at least one sensor 9 configured to detect a level of basic mixture or ice cream in the container 2 and connected to the control and operating unit 6 to generate a signal indicating the level of the basic mixture or ice cream inside the container 2 and the control and operating unit 6 is configured to activate the refrigeration system 4 at the second, preservation power when that signal indicates a level of the basic mixture or ice cream in the container 2 which is below a predetermined value, substantially corresponding to an absence of basic mixture or ice cream inside the container 2.

With reference to adjustment of the cooling thermal power, attention is drawn to the following, independently of the embodiment.

Preferably, the control and operating unit 6 is configured to regulate the speed of the compressor between a first speed value, corresponding to the first, production power, and a second speed value, corresponding to the second, preservation power.

Alternatively, the control and operating unit 6 is configured to regulate the pressure downstream of the throttle valve between a first pressure value, corresponding to the first, production power, and a second pressure value, corresponding to the second, preservation power.

Preferably, when the refrigeration system 4 is brought to the first thermal power, the temperature of the product (mixture or ice cream) the container 2 is between −15° C. and −5° C.

Preferably, when the refrigeration system 4 is brought to the second thermal power, the temperature of the product residues in the container 2 is between −5° C. and +5° C.

With reference to the advantages of the invention, it should be noted that activating the refrigeration system 4 when there is no product in the container makes it possible to prevent (or at least to greatly reduce) the proliferation of bacteria, thereby increasing the food safety of the machine.

In effect, during periods of machine inactivity (for example, between one product batch and another), the refrigeration system 4 of the machine 1 remains on (at the second thermal power) so as to keep the components of the machine, in which there may be product residues from the previous batch, at a temperature which prevents the proliferation of bacteria.

Keeping the cylinder cooled also speeds up the production process of consecutive batches. In effect, the machine components (for example, the mixing and freezing cylinder) which are used to process the product are already at the correct process temperature (and not at ambient temperature), so the machine can start processing the product immediately.

Another advantage is that this also optimizes energy consumption in heavy-duty use because the machine components which process the product are kept at a low temperature at all times, thus avoiding cooling cycles starting from ambient temperature.

More generally speaking, it should thus be noted that the second, cooling thermal power is such that the temperature of the product residues inside the container 2 is lower than a predetermined value (for example, lower than +5° C.).

Still more preferably, when the refrigeration system 4 is brought to the second thermal power, the temperature of the product residues in the container 2 is between −5° C. and +5° C.

Also defined according to the invention is a method for making and dispensing liquid products (in particular, ice creams).

The method comprises the following steps:
preparing a container 2 designed to contain a basic mixture for converting it into ice cream;
mixing the basic mixture in the container 2 and cooling the basic mixture in the container 2 (by means of a first, production thermal power heat exchange, at least to a first, production temperature, for converting the basic mixture into ice cream;
taking the ice cream from the container 2 until the container is completely empty;
cooling the ice cream residues in the completely empty container 2 or in other machine components, such as, for example, the dispensing device (by means of a second, preservation thermal power heat exchange), for keeping the ice cream residues at a second, preservation temperature, where the second, preservation temperature is higher than the first, production temperature.

Preferably, the second, preservation temperature is between −10° C. and +5° C.

Still more preferably, the second, preservation temperature is between −5° C. and +5° C.

According to another aspect, the method comprises a step of detecting the presence of ice cream in the container 2 and the step of cooling the empty container 2 to a second, preservation temperature is carried out if the absence of ice cream in the container 2 has been detected.

According to yet another aspect, the method comprises a step of detecting a level of ice cream in the container 2 and the step of cooling the product residues in the empty container 2 to keep the product residues at a second, preservation temperature is carried out if a level of ice cream which is below a predetermined value has been detected, substantially corresponding to the absence of ice cream in the container 2.

Preferably, according to yet another aspect, the cooling of the product residues in the container 2 to keep the product residues at a second, preservation temperature is carried out substantially continuously for the entire time during which the container 2 is empty.

According to yet another aspect, the method preferably comprises a step of setting the second, preservation temperature.

It should be noted that according to another aspect, the step of cooling the product residues comprises also cooling other components or parts of the machine 1 which may be in contact with product residues.

What is claimed is:

1. A machine for making and dispensing ice creams, comprising in combination:
    a container for containing a basic mixture for converting the basic mixture into ice cream;
    a mixer and a refrigeration system, operatively associated with the container respectively for mixing the basic mixture and for cooling the basic mixture to convert the basic mixture, in the container, into ice cream;
    a control and operating unit, operatively associated with the refrigeration system for controlling activation and deactivation of the refrigeration system and for regulating a cooling thermal power of the refrigeration system at least between a first, production thermal power and a second, preservation thermal power which is lower than the first, production thermal power, the second, preservation thermal power being greater than zero,
    wherein the control and operating unit is configured to allow the refrigeration system to be activated at the second, preservation power when the container is substantially empty.

2. The machine according to claim 1, and further comprising a device for dispensing the ice cream, operatively connected to the container for allowing extraction of the ice cream from the container.

3. The machine according to claim 2, wherein the control and operating unit comprises an operator interface including at least one control element which can be operated by a user for activating the refrigeration system at the second, preservation power.

4. The machine according to claim 2, and further comprising at least one sensor for detecting a presence of basic mixture or ice cream in the container and connected to said control and operating unit for making available a signal indicating the presence of the basic mixture or ice cream in the container and wherein the control and operating unit is programmed to activate the refrigeration system at the second, preservation power when the signal indicates an absence of the basic mixture or ice cream in the container.

5. The machine according to claim 4, wherein the refrigeration system comprises a compressor, and wherein the control and operating unit is programmed to regulate a speed of the compressor between a first speed value, corresponding to the first, production power, and a second speed value, corresponding to the second, preservation power.

6. The machine according to claim 2, and further comprising at least one sensor designed for detecting a level of basic mixture or ice cream in the container and connected to said control and operating unit for making available a signal indicating the level of the basic mixture or ice cream in the container and wherein the control and operating unit is programmed to activate the refrigeration system at the second, preservation power when the signal indicates a level of the basic mixture or ice cream in the container which is below a predetermined value, the level substantially corresponding to an absence of the basic mixture or ice cream in the container.

7. The machine according to claim 6, wherein the refrigeration system comprises a compressor, and wherein the control and operating unit is programmed to regulate a speed of the compressor between a first speed value, corresponding to the first, production power, and a second speed value, corresponding to the second, preservation power.

8. The machine according to claim 1, wherein the control and operating unit comprises an operator interface including at least one control element which can be operated by a user for activating the refrigeration system at the second, preservation power.

9. The machine according to claim 1, and further comprising at least one sensor for detecting a presence of basic mixture or ice cream in the container and connected to said control and operating unit for making available a signal indicating the presence of the basic mixture or ice cream in the container and wherein the control and operating unit is programmed to activate the refrigeration system at the second, preservation power when the signal indicates an absence of the basic mixture or ice cream in the container.

10. The machine according to claim 1, and further comprising at least one sensor designed for detecting a level of basic mixture or ice cream in the container and connected to said control and operating unit for making available a signal indicating the level of the basic mixture or ice cream in the container and wherein the control and operating unit is programmed to activate the refrigeration system at the second, preservation power when the signal indicates a level of the basic mixture or ice cream in the container which is below a predetermined value, the level substantially corresponding to an absence of the basic mixture or ice cream in the container.

11. The machine according to claim 1, wherein the refrigeration system comprises a compressor, and wherein the control and operating unit is programmed to regulate a speed of the compressor between a first speed value, corresponding to the first, production power, and a second speed value, corresponding to the second, preservation power.

12. A method for making and dispensing ice creams, comprising:
    providing a container for containing a basic mixture for converting the basic mixture into ice cream;
    providing a mixer and a refrigeration system, operatively associated with the container respectively for mixing the basic mixture and for cooling the basic mixture to convert the basic mixture, in the container, into ice cream:
    providing a control and operating unit, operatively associated with the refrigeration system for controlling activation and deactivation of the refrigeration system and for regulating a cooling thermal power of the refrigeration system at least between a first, production thermal power and a second, preservation thermal power which is lower than the first, production thermal power, the second, preservation thermal power being greater than zero,
wherein the control and operating unit is configured to allow the refrigeration system to be activated at the second, preservation power when the container is substantially empty,
   mixing the basic mixture in the container and cooling the basic mixture in the container, by a heat exchange at the first, production thermal power to a first, production temperature, for converting the basic mixture into ice cream;
   taking the ice cream from the container until the container is completely empty;
cooling ice cream residues in the completely empty container, by heat exchange at the second, preservation thermal power for keeping the ice cream residues at a second, preservation temperature, the second, preservation temperature being higher than the first, production temperature.

13. The method according to claim 12, wherein the second, preservation temperature is between −10° C. and +5° C.

14. The method according to claim 13, wherein the second, preservation temperature is between −5° C. and +5° C.

15. The method according to any claim 12, and further comprising detecting a presence of ice cream in the container and cooling the empty container to the second, preservation temperature if an absence of ice cream in the container has been detected.

16. The method according to claim 12, and further comprising detecting a level of ice cream in the container and cooling the empty container to the second, preservation temperature if a level of ice cream which is below a predetermined value has been detected, substantially corresponding to an absence of ice cream in the container.

17. The method according to claim 12, and further comprising cooling the empty container to the second, preservation temperature substantially continuously for an entire time during which the container is empty.

18. The method according to claim 12, and further comprising setting the second, preservation temperature.

* * * * *